US011487897B2

(12) United States Patent
Pieniazek et al.

(10) Patent No.: US 11,487,897 B2
(45) Date of Patent: Nov. 1, 2022

(54) GENERATING AND PROCESSING OBFUSCATED SENSITIVE INFORMATION (71) Applicant: EQUIFAX INC., Atlanta, GA (US)

(72) Inventors: Lester Anthony Pieniazek, Alpharetta, GA (US); Stephen Leitner, Alpharetta, GA (US); Steven Hicklin, York (GB)

(73) Assignee: EQUIFAX INC., Atlanta, GA (US)

( * ) Notice: Subject to any disclaimer, the term of this patent is extended or adjusted under 35 U.S.C. 154(b) by 733 days.

(21) Appl. No.: 16/465,909

(22) PCT Filed: Nov. 28, 2017

(86) PCT No.: PCT/US2017/063387
§ 371 (c)(1),
(2) Date: May 31, 2019

(87) PCT Pub. No.: WO2018/102286
PCT Pub. Date: Jun. 7, 2018

(65) Prior Publication Data
US 2020/0074109 A1 Mar. 5, 2020

Related U.S. Application Data (60) Provisional application No. 62/429,295, filed on Dec. 2, 2016.

(51) Int. Cl.
G06F 21/62 (2013.01)
G06F 16/903 (2019.01)
G06F 16/901 (2019.01)

(52) U.S. Cl.
CPC ........ *G06F 21/6245* (2013.01); *G06F 16/901* (2019.01); *G06F 16/903* (2019.01)

(58) Field of Classification Search
CPC .. G06F 21/6245; G06F 16/901; G06F 16/903; H04L 9/00
(Continued)

(56) References Cited

U.S. PATENT DOCUMENTS 8,832,147 B2 9/2014 Rambhia et al.
2010/0306854 A1* 12/2010 Neergaard .......... G06F 21/6254
726/26

(Continued)

FOREIGN PATENT DOCUMENTS

WO 2018102286 A1 6/2018

OTHER PUBLICATIONS

PCT/US2017/063387, "International Search Report and Written Opinion", dated Mar. 8, 2018, 16 pages.

*Primary Examiner* — Jeffrey C Pwu
*Assistant Examiner* — Nega Woldemariam
(74) *Attorney, Agent, or Firm* — Kilpatrick Townsend & Stockton LLP (57) ABSTRACT In some aspects, a computing system can receive a request for a processing operation that involves a query. The computing system can extract a query parameter indicating an entity or information type. The computing system can parse, using the query parameter, an obfuscated dataset that is generated by electronically transforming (i) first sensitive information into first obfuscated data using an obfuscation key and (ii) second sensitive information into second obfuscated data using the obfuscation key. The sensitive information is unreadable in the obfuscated data. The computing system can match the query parameter to the first obfuscated data and the second obfuscated data based on a relationship between the first obfuscated data and the second obfuscated data. The relationship is independent of a meaning of the first and second sensitive information. The computing system can performing the processing operation using the first and second obfuscated data.

14 Claims, 5 Drawing Sheets (58) Field of Classification Search
USPC .......................................................... 726/27
See application file for complete search history.

(56) References Cited

U.S. PATENT DOCUMENTS

| | | |
|---|---|---|
| 2012/0041791 A1 | 2/2012 | Gervais et al. |
| 2014/0082205 A1* | 3/2014 | Abraham ............ H04L 65/1069 709/227 |
| 2014/0237241 A1 | 8/2014 | Kurosawa et al. |
| 2015/0242648 A1* | 8/2015 | Lemmey ................ G08G 5/045 726/30 |
| 2016/0134595 A1* | 5/2016 | Lavinio ................ G06F 21/606 713/168 |
| 2018/0121677 A1* | 5/2018 | Avancha ............. G06F 21/6245 |
| 2018/0285591 A1* | 10/2018 | Thayer ................ G06F 21/6245 |

* cited by examiner

GENERATING AND PROCESSING OBFUSCATED SENSITIVE INFORMATION

CROSS REFERENCE TO RELATED APPLICATIONS

This disclosure claims the benefit of priority of U.S. Provisional Application No. 62/429,295, titled "Generating and Processing Obfuscated Sensitive Information" and filed on Dec. 2, 2016, which is hereby incorporated in its entirety by this reference.

TECHNICAL FIELD

This disclosure generally relates to information security, and more particularly relates to generating and processing obfuscated sensitive information.

BACKGROUND

Various devices can be communicatively coupled via a communication network. In some aspects, a user device is communicatively coupled to a computing device over a communication network. Other devices coupled to the communication network can observe data being communicated between the user device and the computing device. The data can include sensitive information. For example, the data can include personal information such as a user's name, address, or social security number. The sensitive information can be protected by encrypting the sensitive information. The user device or the computing device can encrypt the data and provide the other device with a decryption code for converting the encrypted data to a readable format. Encrypting data can increase the security of a computing environment by preventing other devices coupled to a communication network from understanding the data being communicated between the user device and the computing device.

Existing encryption techniques can secure data from theft and viewing, but some processing techniques (e.g., fuzzy logic) are unusable with encrypted data. The encrypted data may be unusable because existing encryption may not allow processing techniques to recognize abbreviations or synonyms. For example, the data strings "Steve Hicklin 1 High Street" and "Steven Hicklin, One High Street" are related, and some processing techniques can recognize the relationship. An encrypted form of the data strings can include "9e1c49028cb02c936626538b15d5edfd" and "5f26c0b9677a20708f3939bdc8e0cc5e" respectively. No relationship between the encrypted strings can be recognized by the processing techniques. Some existing systems perform these processing techniques by storing data in unencrypted form or unencrypting encrypted data as the data is provided to processing devices, which can make the sensitive information vulnerable to internal and external threats. Thus, there exists a need for obscuring data in a way that still permits processing of the obscured data.

SUMMARY

In some aspects, a computing system can receive a request to perform a processing operation that involves a query regarding an entity or information type. The computing system can extract a query parameter indicating the entity or information type. The computing system can parse, using the query parameter, an obfuscated dataset that is generated by electronically transforming (i) first sensitive information into first obfuscated data using an obfuscation key and (ii) second sensitive information into second obfuscated data using the obfuscation key. The first sensitive information is unreadable in the first obfuscated data and the second sensitive information is unreadable in the second obfuscated data. The computing system can match the query parameter to the first obfuscated data and the second obfuscated data based on a relationship between the first obfuscated data and the second obfuscated data. The relationship is independent of a meaning of the first and second sensitive information. The computing system can performing the processing operation using the first and second obfuscated data.

BRIEF DESCRIPTION OF THE DRAWINGS

Many aspects of the present disclosure can be better understood with reference to the following diagrams. The drawings are not necessarily to scale, with emphasis instead being placed upon clearly illustrating certain features of the disclosure.

DETAILED DESCRIPTION

Certain aspects of this disclosure relate to obfuscating sensitive information and processing the obfuscated sensitive information to reduce unauthorized access to electronically stored, sensitive information. Various sets of sensitive information can be obfuscated using a common obfuscation key to generate sets of obfuscated data in a form by which the obfuscated data can be processed without revealing the underlying sensitive information. For example, the sets of obfuscated data can be processed to identify records in each set that are likely to refer to the same entity or that include the same type of information. By obfuscating sensitive information in a way such that the obfuscated data can be processed, various processing techniques, including those unavailable for use on encrypted data, can be applied to the obfuscated data. Examples of sensitive information can include personal information such as personally identifiable information ("PIP") that can be used on its own or with other information to identify, contact, or locate a single person or entity. For example, PII can include a name, an address, or a social security number.

Certain aspects described herein allow a processing system to perform one or more operations involving related obfuscated data items without requiring the processing system to reveal the sensitive information corresponding to the obfuscated data items. For example, an obfuscated-data processing system or other online computing system can service queries directed to an obfuscated dataset. An obfuscated dataset includes obfuscated data items for an individual or other entity, such as a first record with the string "Tcvaxvi Uvmcivs," which is an obfuscated version of the string "Stephen Leitner," and a second record with the string "Tcvqv Uvmcivs," which is an obfuscated version of the string "Steve Leitner." The obfuscated strings in the first and second records have a relationship (i.e., the presence of "Tcv . . . Uvmcivs) that corresponds to a relationship between the non-obfuscated strings (i.e., the presence of "Ste . . . Leitner" in both "Steve Leitner" and "Stephen Leitner"). The obfuscated-data processing system can extract a query parameter that indicates the individual corresponding to these records (e.g., a query for records involving the name "Steve Leitner" or an obfuscated version of that name). The obfuscated-data processing system can parse the obfuscated dataset for records matching the query parameter. The obfuscated-data processing system can locate the first record having an obfuscated version of an exact match to the query parameter (i.e., an obfuscated version of the name "Steve Leitner"). Furthermore, because since the obfuscated and non-obfuscated strings share certain common features, such as the relationships identified above, the obfuscated-data processing system can also locate the second record having an obfuscated version of a fuzzy match to the query parameter (i.e., an obfuscated version of the name "Stephen Leitner"). In this manner, the obfuscated-data processing system can transform sensitive data into a non-sensitive form while also maintaining certain characteristics of the data that facilitate various matching and processing operations.

In some aspects, obfuscating data can include replacing a set of symbols in the data with another set of symbols based on an obfuscation key regardless of the positon of the set of symbols within the data. The obfuscation key can indicate an existing symbol (e.g., an "e") in the data and a replacement symbol (e.g., a "v") used to replace the existing symbol. If a string includes the set of symbols "Ste," that set of symbols can be obfuscated to a particular set of replacement symbols regardless of the other symbols in the string that precede or follow "Ste." For example, if a first string "Steve" includes a set of symbols "Ste" and a second string "Stephen" also includes the set of symbols "Ste," the set of symbols "Ste" can be obfuscated to the same set of replacement symbols "Tcv." In contrast, encrypting data can include replacing an existing symbol in a data string with one or more symbols based on a characteristic of the existing symbol in relation to the data string. For example, the first "e" in "Steve" may be encrypted differently than the second "e" based on the first "e" being the third letter or based on the second "e" following a "v." Thus, two data sets with minor differences can maintain similarities as obfuscated data that are lost as encrypted data.

The obfuscated-data processing system can be used for processing secure information in fields with a desire to combine or link anonymous and un-keyed data together. The data can be sensitive information and regulatory controls may enforce the data to remain anonymous. For example, the anonymity of medical data in drug trials can be maintained by obfuscating the medical data while still allowing the medical data to be compared with other data gathered during the drug trial. In additional or alternative examples, obfuscating data can allow organizations to share data without revealing information about clients associated with the data.

In some aspects, a system can include a trusted middle subsystem that is not provided with the obfuscation key and that performs processing on the obfuscated data. An attribute provider (e.g., a credit score provider) that operates the obfuscated-data processing system 106 can provide the trusted middle subsystem with obfuscated versions of data associated with each user of the attribute provider. A user of the attribute provider can obtain the obfuscation key from the attribute provider and request an attribute (e.g., a credit score) associated with the user from the trusted middle subsystem. The request can include identifying data of the user in an obfuscated form. The trusted middle subsystem can determine a relationship between the request and the obfuscated data for a user of the attribute provider. The trusted middle subsystem can transmit a response to the user that includes obfuscated data received from the attribute provider. The user can de-obfuscate the obfuscated data to determine the attribute associated with the user.

Thus, certain aspects disclosed herein permit systems to perform processing on obfuscated data such that the obfuscated-data processing system can maintain the data as obfuscated data without needing to persist or display an unsecure version of the sensitive information. For example, the obfuscated-data processing system can apply fuzzy logic to obfuscated data for recognizing matches amongst obfuscated data that may be unrecognizable without unencrypting encrypted data. Fuzzy matching logic can be used with search techniques, data transposition techniques, string matching algorithms, alias tables, and Metaphone tables.

The features discussed herein are not limited to any particular hardware architecture or configuration. A computing device can include any suitable arrangement of components that provide a result conditioned on one or more inputs. Suitable computing devices include multipurpose, microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Figure 1:
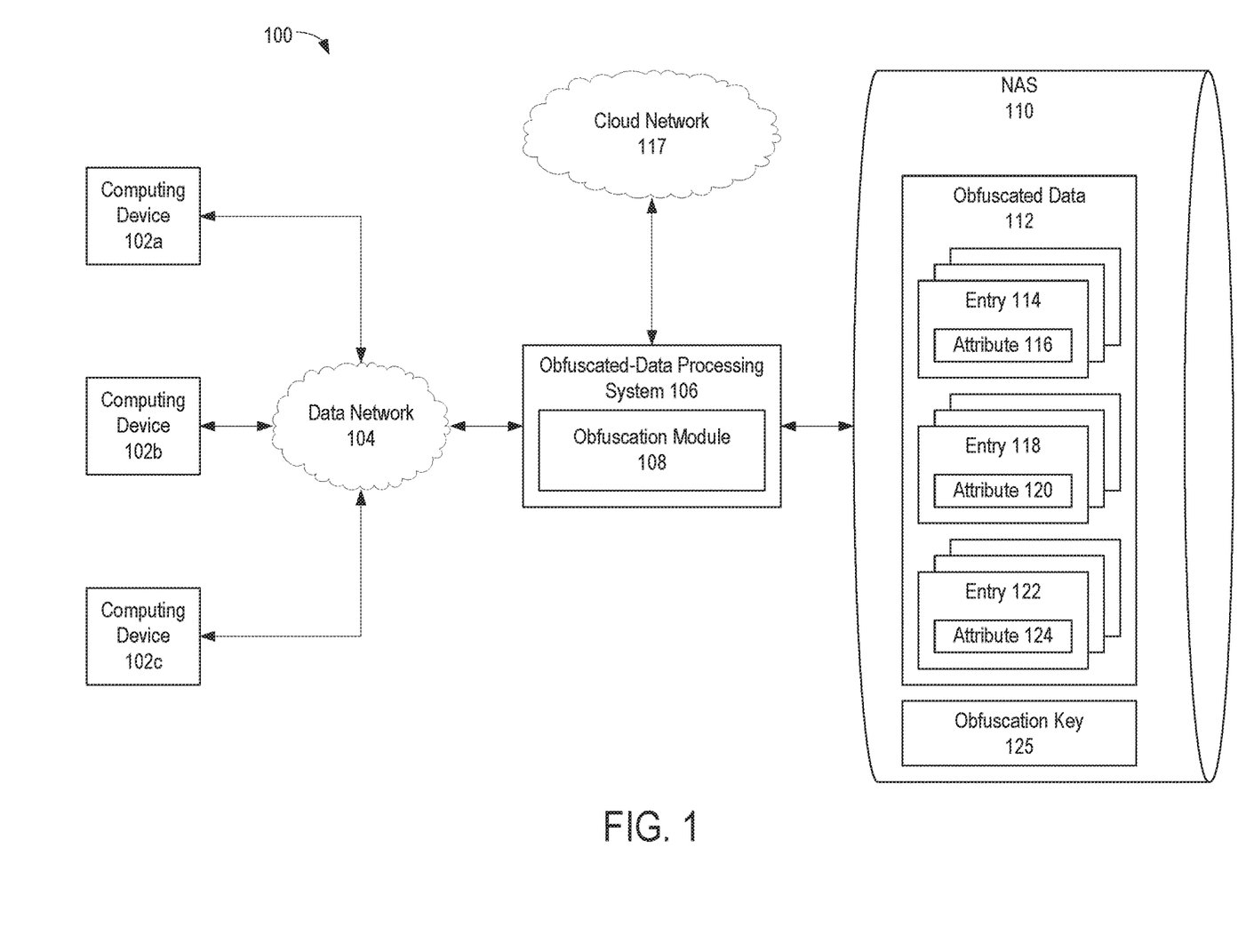
FIG. 1 depicts an example of a computing environment for generating and processing obfuscated sensitive information, according to some aspects of the present disclosure.

Referring now to the drawings, FIG. 1 depicts an example of a computing environment 100 that is usable for obfuscating and processing sensitive information (e.g., personally identifiable information ("PIP")). The computing environment 100 is a specialized computing environment that may be used for processing large amounts of data using a large number of computer processing cycles.

The computing environment 100 may include computing devices 102a-c, an obfuscated-data processing system 106, and a network-attached data stores ("NAS") 110. The computing environment 100 can also include a data network 104 for communicatively coupling the computing devices 102a-c with the obfuscated-data processing system 106. The obfuscated-data processing system 106 may be a specialized computer or other machine that processes the data received within the computing environment 100. The obfuscated-data processing system 106 may include one or more other systems. For example, the obfuscated-data processing system 106 may include a database system for accessing the NAS 110, a communications grid, or both. A communications grid may be a grid-based computing system for processing large amounts of data.

The computing environment 100 may include one or more NAS 110. The NAS 110 can include memory devices for storing obfuscated data 112 to be processed by the obfuscated-data processing system 106. In some aspects, the NAS 110 can also store any intermediate or final data generated by one or more components of the computing environment 100. In some aspects, the obfuscated data 112 can be generated by the obfuscated-data processing system 106 based on data provided by one or more of the computing devices 102a-c. In additional or alternative aspects, the obfuscated data 112 can be provided by one or more computing devices 102a-c, generated by computing devices 102a-c, or otherwise received by the computing environment 100 via a data network 104.

The obfuscated data 112 can include data entry 114 having values for an attribute 116, data entry 118 having values for an attribute 120, and data entry 122 having values for an attribute 124. In some aspects, the data entry 114, 118, 122 can be a category of the obfuscated data associated with a user and an attribute can be a portion of the sensitive information (e.g., a name, an address, an account number, or an identification number) associated with the user. In additional or alternative aspects, attributes can include data (e.g. a credit score) associated with the user.

NAS 110 may also store a variety of different types of data organized in a variety of different ways and from a variety of different sources. For example, NAS 110 may include storage other than primary storage located within obfuscated-data processing system 106 that is directly accessible by processors located therein. NAS 110 may include secondary, tertiary, or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored. Examples of a non-transitory medium may include, for example, a magnetic disk or tape, optical storage media such as compact disk or digital versatile disk, flash memory, or memory devices.

The computing environment 100 can also include one or more computing devices 102a-c. The computing devices 102a-c can include client devices that can communicate with the obfuscated-data processing system 106. For example, the computing devices 102a-c may send data to the obfuscated-data processing system 106 to be processed or may send signals to the obfuscated-data processing system 106 to control different aspects of the obfuscated-data processing system 106 or the data being processed by the obfuscated-data processing system 106. The computing devices 102a-c may interact with the obfuscated-data processing system 106 via the data network 104.

In some aspects, the computing devices 102a-c may include network computers, sensors, databases, or other devices that may transmit or otherwise provide data to obfuscated-data processing system 106. For example, the computing devices 102a-c may include local area network devices, such as routers, hubs, switches, or other computer networking devices.

The obfuscated-data processing system 106 can include one or more processing devices that execute program code, which includes an obfuscation module 108 and is stored on a non-transitory computer-readable medium. In some aspects, the obfuscated-data processing system 106 can receive data having sensitive information from the computing devices 102a-c. The obfuscation module 108 can generate obfuscated data 112 from the sensitive information, thereby transforming the sensitive information into data that prevents an observer from obtaining the meaning of the sensitive information (e.g., preventing the identification of an individual named "Stephen Leitner" by transforming the string "Stephen Leitner" into the string "Tcvaxvi Uvmcivs"). Generating the obfuscated data 112 can include, for example, using an obfuscation key 125 to replace a symbol in a portion of the data with another symbol. In some aspects, the obfuscation key 125 can be generated by a user or another device and provided to the obfuscated-data processing system 106.

The obfuscated-data processing system 106 can determine relationships between data entries in the generated obfuscated data 112 and the data entries 114, 118, 122. In some aspects, the data entries 114, 118, 122 can be updated based on associated data entries generated by the obfuscated-data processing system 106. For example, the obfuscated-data processing system 106 can receive data from the computing devices 102a-c and determine the data is associated with (e.g., describes the same user) the data entries 114, 118, 122. The obfuscated-data processing system 106 can use the received data to update the data entries 114, 118, 122. In some aspects, the obfuscation module 108 can change the obfuscation key 125 can after a predetermined period of time (e.g., twenty-four hours). The obfuscation module 108 can update the obfuscated data 112 based on the change in the obfuscation key 125.

In some aspects, the obfuscated-data processing system 106 can receive a request for the attributes 116, 120, 124 related to one of the data entries 114, 118, 122. The request can include the data in an un-obfuscated form. The obfuscation module 108 can generate an obfuscated version of the data. The obfuscated-data processing system 106 can determine which of the data entries 114, 118, 122 that are associated with the request. In response to determining the data entries 114, 118, 122 that are associated with the request, the obfuscated-data processing system 106 can transmit a response to the request via a data network, where response includes the attributes 116, 120, 124 to the source of the request.

The computing environment 100 may also include one or more cloud networks 117. A cloud network 117 may include a cloud infrastructure system that provides cloud services. In certain examples, services provided by the cloud network 117 may include a host of services that are made available to users of the cloud infrastructure system on demand. A cloud network 117 is shown in FIG. 1 as being connected to an obfuscated-data processing system 106 (and therefore having the obfuscated-data processing system 106 as its client or user). But the cloud network 117 may be connected to or utilized by any of the devices in FIG. 1. Services provided by the cloud network 117 can dynamically scale to meet the needs of its users. The cloud network 117 may include one or more computers, servers, or systems. In some aspects, one or more end-user devices can access the obfuscated-data processing system 106, the NAS 110, or some combination thereof via the cloud network 117. The end-user devices can transmit additional obfuscated data via the cloud network 117 to the obfuscated-data processing system 106. The obfuscated-data processing system 106 can determine data entries 114, 118, 122 related to the additional obfuscated data and transmit the related data entries 114, 118, 122 to the end-user device via the cloud network 117.

The numbers of devices depicted in FIG. 1 are provided for illustrative purposes. Different numbers of devices may be used. For example, while each device, server, and system in FIG. 1 is shown as a single device, multiple devices may instead be used.

Each communication within the computing environment 100 (e.g., between client devices or between a server and a device) may occur over one or more data networks 104. A data network 104 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in the data network 104. The data networks 104 can be incorporated entirely within (or can include) an intranet, an extranet, or a combination thereof. In one example, communications between two or more systems or devices can be achieved by a secure communications protocol, such as secure sockets layer ("SSL") or transport layer security ("TLS"). In addition, data or transactional details may be encrypted.

Figure 2:
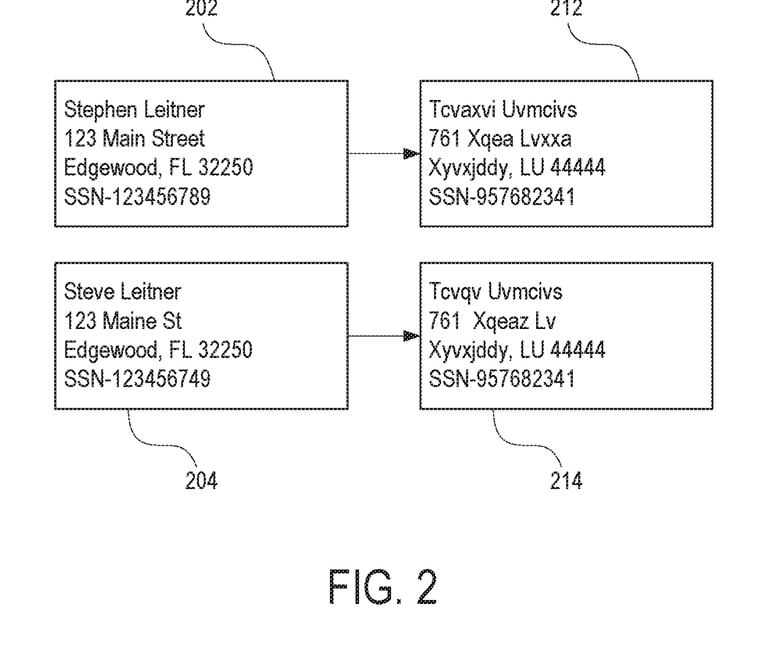
FIG. 2 depicts an example of sensitive information and obfuscated sensitive information, according to some aspects of the present disclosure.

FIG. 2 depicts an example of data flow for generating obfuscated data 212, 214 from data 202, 204. The data 202, 204 can include personal information such as PII data, which can be used to identify a user associated with the data 202, 204. The data 202, 204 may be associated with a single user, Mr. Leitner, as the name "Steve" can be an alias for the name "Stephen," "St" is an abbreviation for "Street," "Maine" can be an alternate spelling of "Main," and an error in data inputs may have resulted in the single digit difference in the social security number. Obfuscating data 202, 204 can allow the similarities between data 202 and data 204 to remain while providing protection for the personal information. By contrast, encrypting data 202, 204 using systems other than the obfuscated-data processing system 106 depicted in FIG. 1 may result in two independent encoded strings such that the similarities (and underlying relationship) between data 202 and data 204 are unrecognizable.

In some aspects, each type of sensitive information (e.g., name, address, and social security number) can be obfuscated using a different obfuscation key. For example, the name "Stephen Leitner" is obfuscated using an obfuscation key that is different than the obfuscation key used to obfuscate the address "123 Main Street Edgewood, Fla." The name "Stephen Leitner" can be obfuscated to "Tcvaxvi Uvmcivs" using an obfuscation key. The obfuscation key can replace each letter in "Steve Leitner" with another letter. For example, the obfuscation key replaces the letter "S" with "T," replaces the letter "t" with "c," and the letter "e" with "v." The address "123 Main Street Edgewood, Fla." can be obfuscated to "761 Xquea Lvxxa Xyvxjddy, LU" using an obfuscation key that is used to replace the letter "e" with "x." In additional or alternative aspects, additional portions of sensitive information (e.g., the house number, the street address, the city, and the state) can be obfuscated using additional, different obfuscation keys.

In some aspects, portions of the data can be masked by using a single symbol to replace more than one different symbol in the data. For example, the zip code "32250" is masked with "44444." In additional or alternative aspects, portions of the data can remain un-obfuscated. For example, the tag "SSN-" in the data 202, 204 remains in the obfuscated data 212, 214.

The obfuscated data 212, 214 can maintain the similarities apparent between data 202 and data 204 such that fuzzy matching logic can determine the relationship between the obfuscated data 212 and the obfuscated data 214. For example, string-matching techniques can recognize "Lv" as the abbreviation for "Lvxxa" and can recognize "Xqeaz" as an alternate spelling of "Xqea."

Figure 3:
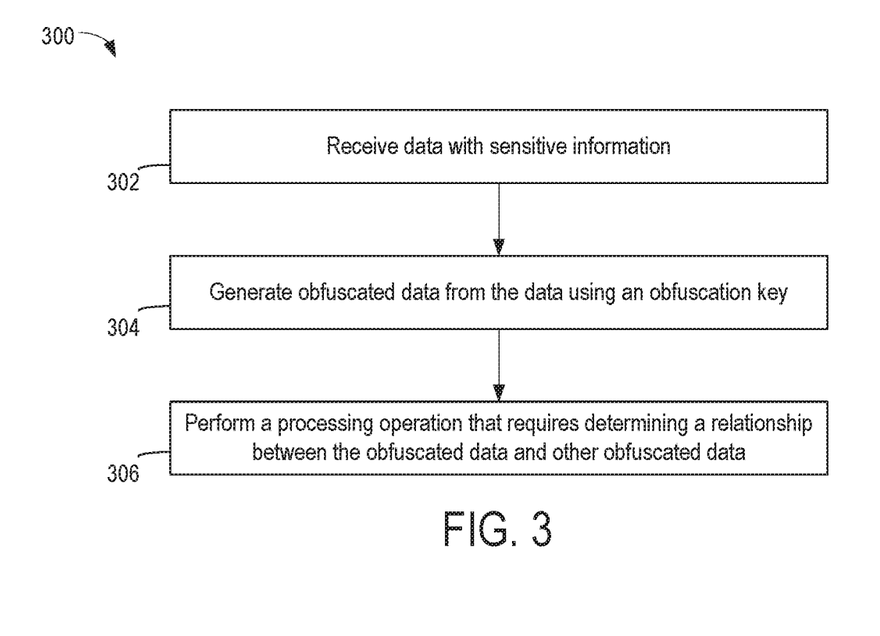
FIG. 3 depicts an example of a process for obfuscating sensitive information and processing the sensitive information as obfuscated sensitive information, according to some aspects of the present disclosure.

FIG. 3 is a flow chart depicting an example of a process 300 for obfuscating sensitive information. The process is described with respect to the computing environment 100 of FIG. 1, unless otherwise specified, though other implementations are possible without departing from the scope of the present disclosure.

In block 302, the process 300 involves receiving data with sensitive information. One or more processing devices implement block 302. The data received by a processing device at block 302 can be clear text having a meaning that can be read and understood by an observer, such as a name that be matched to a person or place. The data can be received via a data network from another computing device, via a local input device at the same computing device that includes the processing device, or some combination thereof. In some aspects, a processing device that implements block 302 can be included in (or communicatively coupled to) the obfuscated-data processing system 106. In additional or alternative aspects, a processing device that implements block 302 can be included in (or communicatively coupled to) one or more of the computing devices 102a-c.

In block 304, the process 300 involves using an obfuscation key (e.g., the obfuscation key 125 depicted in FIG. 1) to generate obfuscated data from the received data having sensitive information. One or more processing devices implement block 304. In some aspects, the obfuscated data can be generated by the obfuscated-data processing system 106. In additional or alternative aspects, the obfuscated data can be generated by one or more of computing devices 102a-c and transmitted to the obfuscated-data processing system 106 as obfuscated data.

In some aspects, the obfuscation key 125 that is used at block 302 can include a look-up table. For instance, a processing device can obfuscate the data by performing a byte scramble operation that involves the look-up table. The data can be processed as an ASCII string. The byte scramble operation can replace characters in the ASCII string with a symbol linked to the characters in the look-up table that acts as the obfuscation key 125. The look-up table can include a list of symbols, where each symbol is linked to another symbol. In some aspects, a look-up table L can be an array of 256 characters (e.g., char L[256]). Data can be obfuscated by replacing each symbol to be obfuscated with another symbol that is linked, via the look-up table, to the symbol to be obfuscated (e.g., $x[i] \rightarrow L[x[i]]$, where x is the data string and x[i] is a specific character in the data string).

In some aspects, obfuscated data can be de-obfuscated using an inverse scramble. An inverse scramble can involve using a look-up table to replace the symbols in the obfuscated data with the other symbols linked to the symbols. The look-up table can indicate that one or more characters are to be left unchanged (e.g., L[i]=i). An operation that leaves a character un-changed can be referred to as a "stay." Other characters may be masked by replacing different characters with a fixed symbol (e.g., L[i]=*, where * is the fixed symbol) such that the masked portion cannot be de-obfuscated. The look-up table may separate characters, numbers, and punctuation such that each type of symbol is linked to a symbol of the same type.

In some aspects, a look-up table can be generated by applying permutation cycles to a set of symbols after determining the symbols to remain the same and the symbols to be masked. Permutation cycles of a predetermined size can be used such that every type of symbol is linked to another type of symbol. A set of permutations $S_n$, can denote permutations $\{0, 1, \ldots, n-1\}$ for mapping n symbols onto themselves. The permutations can include k-cycles, which illustrate symbol mapping. For example, k-cycle $(i_0, i_1, \ldots i_{k-1})$ can denote $i_0 \to i_1 \to \ldots i_{k-1} \to i_0$.

In some aspects, a base permutation $\pi \in S_n$ can be formed from a natural number sequence key. A finite sequence of h natural number $z_0, z_1, \ldots, z_n$ can be truncate-extended and normalized to form a factorial number system representation $f_i$, where $f_i = f_n, f_{n-1}, \ldots f_1$ for $f_i \leq i$. The Lehmer code or an inversion table can be used to map a number inversion $f_i$ to a permutation $\varphi \in S_n$. A Faro shuffle $\varphi$ with m cuts can be used to obtain the base permutation $\pi$. A permutation $S \in S_n$ can be generated with a specified cycle structure based on the base permutation. The number of symbols n can be partitioned into $k_i$ different cycles. The maximum size and minimum size for $k_i$ can be configured. Keeping $k_i > 1$ can avoid fixed points, or symbols that remain the same. S can be defined as a product of i+1 cycles using the base permutation $(\pi_0, \pi_1, \ldots \pi_{k_0-1})(\pi_{k_0}, \pi_{k_0+1}, \ldots \pi_{k_0+k_1-1}) \ldots (\pi_{k_0+\ldots+k_{i-1}} \ldots \pi_{n-1})$.

Obfuscating data using a look-up table can hide the plain meaning of data strings from unauthorized users. Obfuscating data can also conserve certain features of the data strings. For example, linking a single symbol with a single other symbol can maintain relationships both between the symbols within the data string and between data having similar data strings. Obfuscating data using a global look-up table can also prevent accidental relationships, which can occur when data is encrypted.

Consistent lexical encoding can be achieved by using single symbol to single symbol encoding or masking in the look-up table and can enable fuzzy matching logic to be used in analyzing obfuscated data. For example, social security numbers "123-45-6789" and "123-54-6789" have a single transposition of the fourth and fifth symbol. This transposition is recognizable in obfuscated data in which the "4" and "5" in each number are each replaced by the same symbol. By contrast, encryption of the two social security numbers can result in the "4" in one social security number being replaced by a different symbol or symbols than the "4" in the other social security number. In some aspects, obfuscated data can maintain relationships such as substrings and small edit distances. Consistent lexical encoding can also enable limited format checking. Examples of limited format checking include checking alphabet or numeric patterns, checking correct sizes for data strings, etc.

In block 306, the process 300 involves performing a processing operation that requires determining a relationship between the obfuscated data and other obfuscated data. One or more processing devices implement the block 306. Determining a relationship between the obfuscated data and other obfuscated data can include, for example, matching at least some obfuscated data between two data objects, such as the obfuscated versions of a last name in two data records that include obfuscated versions of an entity's name. The relationship among different obfuscated data items can be independent of a meaning of different items of sensitive information from which the obfuscated data items were generated.

For instance, obfuscated data can maintain the relationship between the symbols within the data that were present in the original data. For example, "Stephen" and "TCVAXVP" have the same length, and the distance between the "e" characters in "Stephen" is the same as the distance between the "v" characters in "TCVAXVI." A similar relationship is also maintained with respect to the string "Steve" and its obfuscated counterpart "TCVQV." Relationships between portions of un-obfuscated data can be maintained in the obfuscated data. The relationship between portions of obfuscated data can be determined using the same processing techniques used for determining a relationship between the un-obfuscated data. For example, the processing device can use fuzzy matching logic such as 8-for-9 matching, edit distance, substring matching, alias table matching, or Metaphone table matching.

Figure 4:
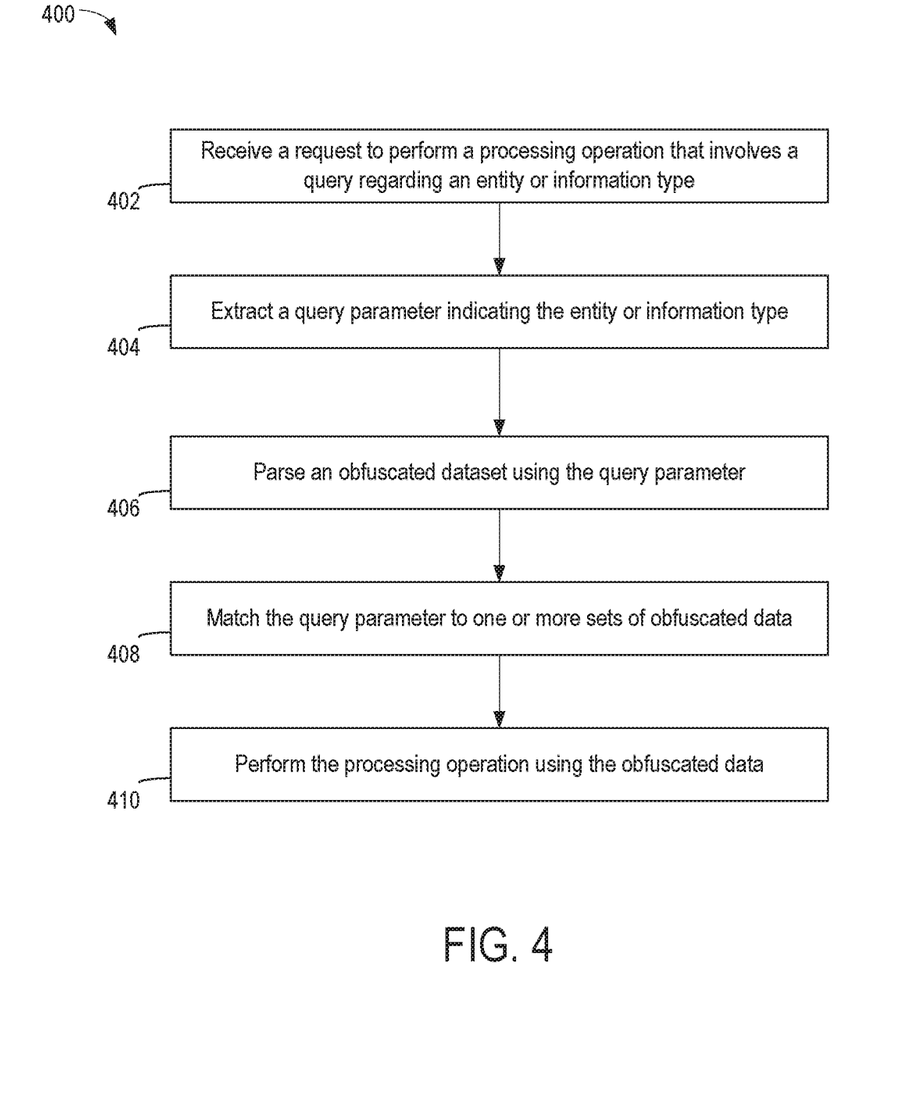
FIG. 4 depicts an example of a process for servicing a query that involves obfuscated sensitive information, according to some aspects of the present disclosure.

Processing operations that involve relationship among obfuscated data include, for example, queries to data structures that store obfuscated datasets. For instance, FIG. 4 is a flow chart depicting an example of a process 400 for servicing a query that involves obfuscated sensitive information. The process is described with respect to one or more examples described herein with respect to FIGS. 1-3. But other implementations are possible without departing from the scope of the present disclosure.

In block 402, the process 400 involves receiving a request to perform a processing operation that involves a query regarding an entity or information type. One or more processing devices implement block 402. Processing operations can include, for example, performing analytical operations applied to certain datasets, modeling operations applied to datasets, retrieval and transmission of relevant datasets, etc. Examples of a query regarding an entity or information type can include a request for certain types of information, a request for information associated with a certain entity, a request for information associated with one or more entities that meet certain criteria, or some combination thereof.

In block 404, the process 400 involves extracting a query parameter indicating the entity or information type. One or more processing devices implement block 404. The query parameter can identify or otherwise indicate the entity or information type. In some aspects, the query parameter includes can identify or otherwise indicate the entity or information type using clear text or other non-obfuscated data. The processing device can transform the query parameter into an obfuscated version of the query parameter to search for relevant obfuscated data items. In additional or alternative aspects, the query parameter includes can identify or otherwise indicate the entity or information type using obfuscated data. For instance, the computing device that sends the request or query can access the obfuscation key and generate an obfuscated version of an identifier for the entity or information type. The sending device can include the obfuscated version of the identifier as the query parameter to be extracted at block 404.

In block 406, the process 400 involves parsing an obfuscated dataset using the query parameter. One or more processing devices implement block 406. In some aspects, the processing device uses an obfuscation key to transform the query parameter into an obfuscated version of the query parameter. The processing device parses an obfuscated dataset to search for one or more items matching the transformed query parameter. In other aspects, the extracted query parameter includes obfuscated data, such as an obfuscated version of sensitive data, without requiring transformation by the system performing the process 400. The processing device parses an obfuscated dataset to search for one or more items matching the extracted query parameter.

In block 408, the process 400 involves matching the query parameter to one or more sets of obfuscated data. One or more processing devices implement block 408. A processing device performs the match based on a relationship between the obfuscated dataset stored in a data structure and obfuscated data included in or derived from the extracted query parameter. In some aspects, matching the query parameter involves matching a transformed query parameter, such as an obfuscated version of the extracted query parameter, to relevant obfuscated datasets. In additional or alternative aspects, matching the query parameter involves matching a query parameter, which includes obfuscated data, to relevant obfuscated datasets without transforming the query parameter.

In block 410, the process 400 involves performing the processing operation using the obfuscated data. One or more processing devices implement block 410. Examples of processing operations include retrieving and transmitting attribute data associated with an entity, performing predictive analysis, etc. In some aspects, the processing operation includes transmitting, via a data network, a response to a computing device from which the request was received. The response can include query results obtained by servicing the query, data generated by processing the query results, or some combination thereof.

Any suitable computing system can perform the process 400. In some aspects, the obfuscated-data processing system 106 performs one or more operations from the process 400. In additional or alternative aspects, the obfuscated-data processing system 106 performs one or more operations of the process 300 that generates obfuscated data using an obfuscation key, and a separate system that lacks access to an obfuscation key performs one or more operations from the process 400.

Figure 5:
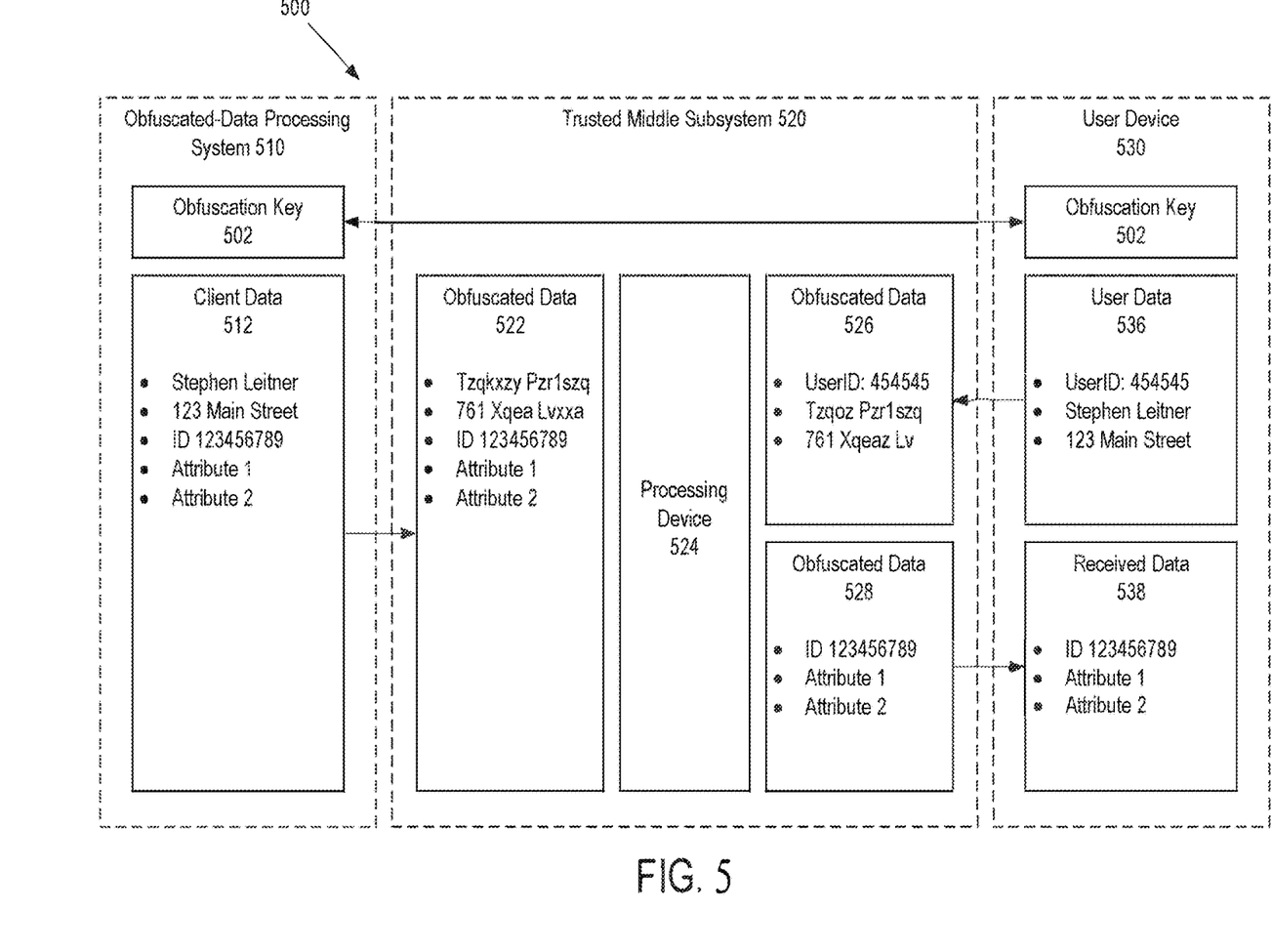
FIG. 5 depicts an example of a flow of information in a computing environment having a trusted middle subsystem for processing obfuscated sensitive information, according to some aspects of the present disclosure.

An example of such a separate system is a trusted middle subsystem, as depicted in FIG. 5. FIG. 5 depicts an example in which a computing environment 500 having a trusted middle subsystem 520 is used for processing obfuscated sensitive information. The computing environment 500 can also include a computing system 510 and a user device 530 communicatively coupled to the trusted middle subsystem 520. In some aspects, the computing environment 500 can be an example of the computing environment 100 in FIG. 1. The computing system 510 can be an example of obfuscated-data processing system 106, the trusted middle subsystem 520 can be one of the computing devices 102a-c, and the user device 530 can be another one of the computing devices 102a-c.

In some aspects, the computing system 510 can include a database for storing client data 512. In additional or alternative aspects, the computing system 510 can be communicatively coupled to a database for storing the client data 512. For example, the computing system 510 can include the obfuscated-data processing system 106 of FIG. 1 and be communicatively coupled to the NAS 110 for storing the client data 512. The computing system 510 can update the client data 512 with attributes (e.g., credit scores or account balances) based on information received or determined by the computing system 510.

In some aspects, the user device 530 can include a mobile phone or a personal computer that can receive inputs from a user. The user device 530 can receive user data 536 as input from the user. The user data 536 can include sensitive information (e.g., a name or a street address of the user). In some aspects, the user device 530 can include a database for storing the user data 536 and can request updates of the user data 536 from the trusted middle subsystem 520 on a predetermined cycle (e.g., daily).

The computing system 510 and user device 530 can share an obfuscation key 502 that can be generated by the computing system 510, user device 530, or another device in the computing environment 500. The obfuscation key 502 can be used by the computing system 510 to obfuscate the client data 512 prior to transmitting the obfuscated data 522 to a trusted middle subsystem 520. The obfuscation key 502 can also be used by the user device 530 for obfuscating the user data 536 prior to transmitting the obfuscated data 526 to the trusted middle subsystem 520.

The trusted middle subsystem 520 can include a processing device 524. The processing device 524 can determine a relationship between the obfuscated data 526 received from the user device 530 and a portion of the obfuscated data 522 received from the computing system 510. For instance, the processing device 524 can determine the relationship when performing one or more operations of the process 400 described above with respect to FIG. 4. In some aspects, the processing device 524 can receive, from the user device 530, a request that one or more attributes associated with the obfuscated data 526 be transmitted to the trusted middle subsystem 520. The trusted middle subsystem 520 can match a query parameter from this request to the obfuscated data 522 and the obfuscated data 526 by determining that one or more attributes included in the obfuscated data 522 are related to the obfuscated data 526. The trusted middle subsystem 520 can transmit obfuscated data 528 that includes the attributes to the user device 530, which can use the obfuscation key 502 to generate received data 538.

In some aspects, the trusted middle subsystem 520 processes, displays, or stores data in an obfuscated form such that the user's sensitive information remains secure. In some aspects, the trusted middle subsystem 520 may receive the obfuscation key 502 for generating processing tools (e.g., alias tables and abbreviation tables). In additional or alternative aspects, the trusted middle subsystem may receive the processing tools from another device in the computing environment 500. The processing tools can be used by the processing device 524 to perform fuzzy matching logic in determining a relationship between the obfuscated data 526 received from the user device 530 and the obfuscated data 522 received from the computing system 510.

Figure 6:
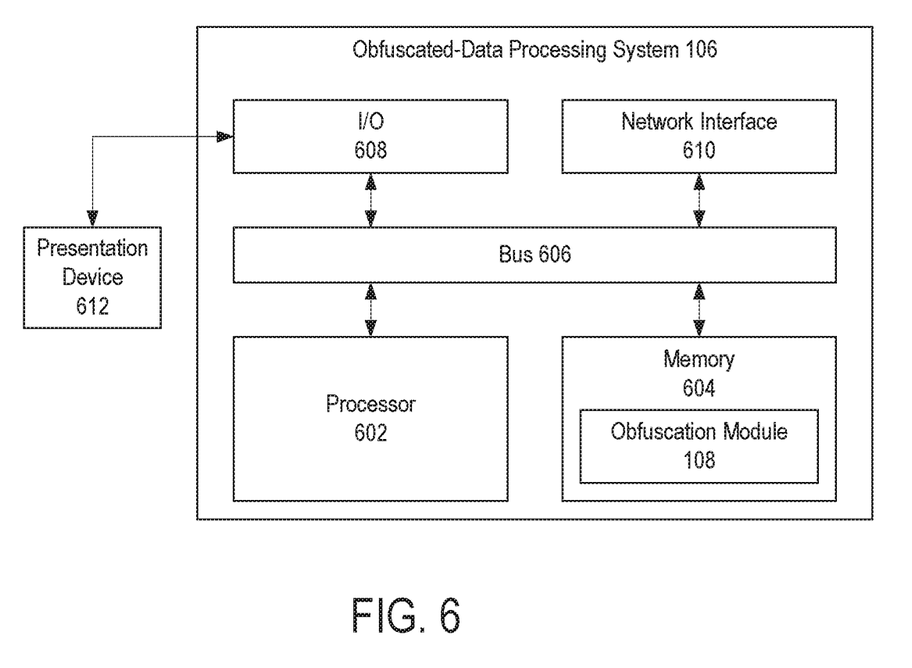
FIG. 6 depicts an example of a computing system for processing obfuscated information, according to some aspects of the present disclosure.

Any suitable computing system or group of computing systems can be used to perform the obfuscating operations described herein. For example, FIG. 6 is a block diagram depicting an example of the obfuscated-data processing system 106. The example of the obfuscated-data processing system 106 can include various devices for communicating with other devices in the computing environment 100, as described with respect to FIG. 1. The obfuscated-data processing system 106 can include various devices for performing one or more obfuscating operations described above with respect to FIGS. 1-5.

The obfuscated-data processing system 106 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C#, Visual Basic, Java, Python, Perl, JavaScript, ActionScript, etc.

The obfuscated-data processing system 106 may also include a number of external or internal devices such as input or output devices. For example, the obfuscated-data processing system 106 is shown with an input/output interface 608 that can receive input from input devices and provide information, data, or signals to output devices. A bus 606 can also be included in the obfuscated-data processing system 106. The bus 606 can communicatively couple one or more components of the obfuscated-data processing system 106.

The obfuscated-data processing system 106 can execute program code that includes the obfuscation module 108. The program code for the obfuscation module 108 may be resident in any suitable computer-readable medium and may be executed on any suitable processing device. For example, as depicted in FIG. 6, the program code for the obfuscation module 108 can reside in the memory 604 at the obfuscated-data processing system 106. Executing the obfuscation module 108 can configure the processor 602 to perform the operations described herein.

In some aspects, the obfuscated-data processing system 106 can include one or more output devices. One example of an output device is the network interface device 610 depicted in FIG. 6. A network interface device 610 can include any device or group of devices suitable for establishing a wired or wireless data connection to one or more data networks 104. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method comprising:
receiving, by a processing device, a request to perform a processing operation, wherein performing the processing operation involves a query regarding an entity or information type;
extracting, by the processing device and from the request, a query parameter indicating the entity or information type;
parsing, by the processing device, an obfuscated dataset using an obfuscated query parameter, wherein the obfuscated query parameter comprises data of the query parameter transformed using an obfuscation key, wherein the obfuscated dataset is generated by electronically transforming (i) first sensitive information into first obfuscated data using the obfuscation key and (ii) second sensitive information into second obfuscated data using the obfuscation key, wherein the first sensitive information is unreadable in the first obfuscated data and the second sensitive information is unreadable in the second obfuscated data, wherein the query includes (i) the second sensitive information as the query parameter and (ii) a request for information associated with a meaning of the second sensitive information, and wherein the obfuscated query parameter includes the second obfuscated data;

matching, by the processing device, the obfuscated query parameter to the first obfuscated data and the second obfuscated data based on a relationship between the first obfuscated data and the second obfuscated data that is independent of a meaning of the first sensitive information and the second sensitive information; and performing, by the processing device, the processing operation using the first obfuscated data and second obfuscated data, the processing operation comprising:

determining that the information associated with the meaning of the second sensitive information is included in the first obfuscated data based on matching the obfuscated query parameter to the first obfuscated data and the second obfuscated data, and transmitting a response having the information to a computing device from which the request was received.

2. The method of claim 1, further comprising:
generating, by the processing device and based on the obfuscation key, an alias table having an obfuscated alias for a portion of the first obfuscated data,
wherein matching the obfuscated query parameter to the first obfuscated data and second obfuscated data comprises determining the relationship based on a comparison of the obfuscated alias with the second obfuscated data.

3. The method of claim 1, wherein matching the obfuscated query parameter to the first obfuscated data and second obfuscated data comprises determining the relationship based on a comparison of the first obfuscated data and the second obfuscated data using fuzzy matching logic.

4. The method of claim 1, further comprising:
accessing, by the processing device, a new obfuscation key; and
generating, by the processing device, updated obfuscated data by electronically transforming the first obfuscated data into the updated obfuscated data using changes between the obfuscation key and the new obfuscation key.

5. The method of claim 1, wherein the processing device is included in a trusted middle subsystem that lacks the obfuscation key, wherein the trusted middle subsystem receives the first obfuscated data and the second obfuscated data from an obfuscated-data processing system.

6. A system comprising:
a non-transitory computer-readable medium having a data structure in which an obfuscated dataset is stored, wherein the obfuscated dataset is an electronic transformation of (i) first sensitive information into first obfuscated data using an obfuscation key and (ii) second sensitive information into second obfuscated data using the obfuscation key, wherein the first sensitive information is unreadable in the first obfuscated data and the second sensitive information is unreadable in the second obfuscated data; and one or more processing devices communicatively coupled to the non-transitory computer-readable medium and configured to perform operations comprising:

extracting, from a query regarding an entity or information type, a query parameter indicating the entity or information type, wherein the query includes (i) the second sensitive information as the query parameter and (ii) a request for information associated with a meaning of the second sensitive information, parsing the obfuscated dataset using an obfuscated query parameter that comprises data from the query parameter transformed using the obfuscation key, wherein the obfuscated query parameter includes the second obfuscated data, matching the obfuscated query parameter to the first obfuscated data and the second obfuscated data based on a relationship between the first obfuscated data and the second obfuscated data that is independent of a meaning of the first sensitive information and the second sensitive information, and performing a processing operation using the first obfuscated data and second obfuscated data, the processing operation comprising:

determining that the information associated with the meaning of the second sensitive information is included in the first obfuscated data based on matching the obfuscated query parameter to the first obfuscated data and the second obfuscated data, and transmitting a response having the information to a computing device from which the request was received.

7. The system of claim 6, the operations further comprising:
generating, based on the obfuscation key, an alias table having an obfuscated alias for a portion of the first obfuscated data,
wherein matching the obfuscated query parameter to the first obfuscated data and second obfuscated data comprises determining the relationship based on a comparison of the obfuscated alias with the second obfuscated data.

8. The system of claim 6, wherein matching the obfuscated query parameter to the first obfuscated data and second obfuscated data comprises determining the relationship based on a comparison of the first obfuscated data and the second obfuscated data using fuzzy matching logic.

9. The system of claim 6, the operations further comprising:
accessing a new obfuscation key; and
generating updated obfuscated data by electronically transforming the first obfuscated data into the updated obfuscated data using changes between the obfuscation key and the new obfuscation key.

10. The system of claim 6, wherein the one or more processing devices are included in a trusted middle system that lacks the obfuscation key, wherein the system further comprises an obfuscated-data processing device configured for:

electronically transforming (i) the first sensitive information into the first obfuscated data using the obfuscation key and (ii) the second sensitive information into the second obfuscated data using the obfuscation key; and transmitting the first obfuscated data and the second obfuscated data to the trusted middle system via a data network.

11. A non-transitory computer-readable medium having program code stored thereon that is executable by one or more processing devices, wherein the program code, when executed by the one or more processing devices, causes the one or more processing devices to perform operations comprising:

receiving a request to perform a processing operation, wherein performing the processing operation involves a query regarding an entity or information type;

extracting, from the request, a query parameter indicating the entity or information type;

parsing an obfuscated dataset using an obfuscated query parameter, wherein the obfuscated query parameter comprises data of the query parameter transformed using an obfuscation key, wherein the obfuscated dataset is generated by electronically transforming (i) first sensitive information into first obfuscated data using an obfuscation key and (ii) second sensitive information into second obfuscated data using the obfuscation key, wherein the first sensitive information is unreadable in the first obfuscated data and the second sensitive information is unreadable in the second obfuscated data, wherein the query includes (i) second sensitive information as the query parameter and (ii) a request for information associated with a meaning of the second sensitive information, and wherein the obfuscated query parameter includes the second obfuscated data;

matching the obfuscated query parameter to the first obfuscated data and the second obfuscated data based on a relationship between the first obfuscated data and the second obfuscated data that is independent of a meaning of the first sensitive information and the second sensitive information; and performing the processing operation using the first obfuscated data and second obfuscated data, the processing operation comprising:

determining that the information associated with the meaning of the second sensitive information is included in the first obfuscated data based on matching the obfuscated query parameter to the first obfuscated data and the second obfuscated data, and transmitting a response having the information to a computing device from which the request was received.

12. The non-transitory computer-readable medium of claim 11, the operations further comprising:

generating, based on the obfuscation key, an alias table having an obfuscated alias for a portion of the first obfuscated data, wherein matching the obfuscated query parameter to the first obfuscated data and second obfuscated data comprises determining the relationship based on a comparison of the obfuscated alias with the second obfuscated data.

13. The non-transitory computer-readable medium of claim 11, wherein matching the obfuscated query parameter to the first obfuscated data and second obfuscated data comprises determining the relationship based on a comparison of the first obfuscated data and the second obfuscated data using fuzzy matching logic.

14. The non-transitory computer-readable medium of claim 11, the operations further comprising:

accessing a new obfuscation key; and generating updated obfuscated data by electronically transforming the first obfuscated data into the updated obfuscated data using changes between the obfuscation key and the new obfuscation key.

* * * * *